Figure 1:
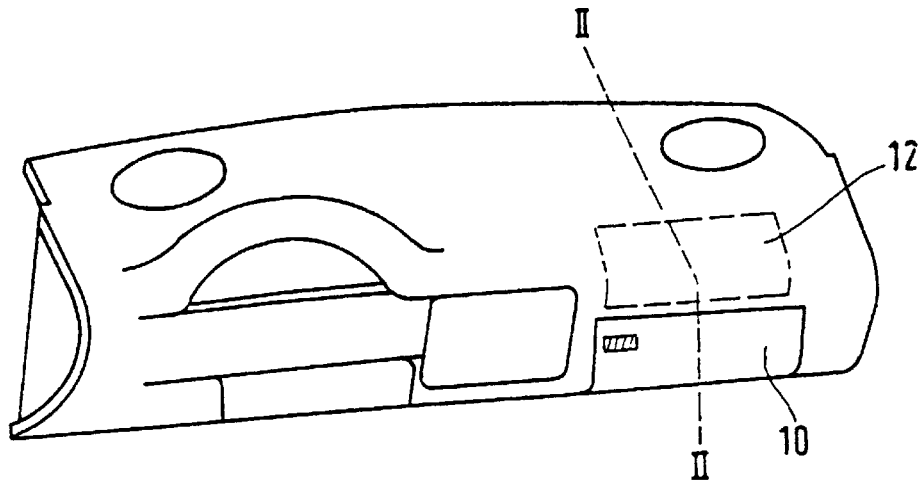

United States Patent [19]
Rahmstorf et al.

[11] Patent Number: 6,106,003
[45] Date of Patent: Aug. 22, 2000

[54] INTERIOR TRIM PANEL FOR MOTOR VEHICLES FITTED WITH AN AIRBAG

[75] Inventors: Peter Rahmstorf, Saint Laurent du Pont; Lydia Creutz, Ingwiller, both of France

[73] Assignee: Sommer Allibert-Lignotock GmbH, Worth Am Rheim, Germany

[21] Appl. No.: 09/297,319

[22] PCT Filed: Oct. 21, 1997

[86] PCT No.: PCT/DE97/02515

§ 371 Date: Jun. 18, 1999

§ 102(e) Date: Jun. 18, 1999

[87] PCT Pub. No.: WO98/18658

PCT Pub. Date: May 7, 1998

[30] Foreign Application Priority Data

Oct. 31, 1996 [DE] Germany ............................ 196 46 548

[51] Int. Cl.[7] .................................................. B60R 21/20
[52] U.S. Cl. ...................................... 280/728.3; 280/732
[58] Field of Search ................................ 280/728.3, 731, 280/732

[56] References Cited

U.S. PATENT DOCUMENTS

| | | | |
|---|---|---|---|
| 4,989,896 | 2/1991 | DiSalvo et al. | 280/728.3 |
| 5,082,310 | 1/1992 | Bauer | 280/728.3 |
| 5,108,128 | 4/1992 | Parker et al. | 280/728.3 |
| 5,154,444 | 10/1992 | Nelson | 280/728.3 |
| 5,280,947 | 1/1994 | Cooper | 280/728.3 |
| 5,466,000 | 11/1995 | Leonard et al. | 280/728.3 |
| 5,533,749 | 7/1996 | Leonard et al. | 280/728.3 |
| 5,611,564 | 3/1997 | Bauer | 280/728.3 |

*Primary Examiner*—Kenneth R. Rice
*Attorney, Agent, or Firm*—Barnes & Thornburg

[57] ABSTRACT

The invention relates to an interior trim panel for motor vehicles fitted with an airbag. Said panel consists of a dimensionally stable supporting member (3) with a film cover (1) on its visible face, and is provided with a tear-open airbag penetration area for expansion of airbag at the point where the airbag is installed (9'). The airbag penetration area is defined by notches (5) in the supporting member (3). The support member has a guide channel (3'), which is integrally formed at the rear, for the expanding airbag. The opening (12) of this channel is covered by the supporting member and the film cover on the visible face which is devoid of any markings. The notches of the guide-channel opening define a pocket-like opening penetration area during airbag expansion. Said notches form a pattern of lines consisting of a center line and side lines which branch off parallel to or diagonally from the center line. A cutting metal sheet (4) is arranged in the line pattern area between the supporting element and the cover. It has cutting edges, which when oriented towards the cover, coincide with the line pattern of the notches.

20 Claims, 5 Drawing Sheets

FIG. 3
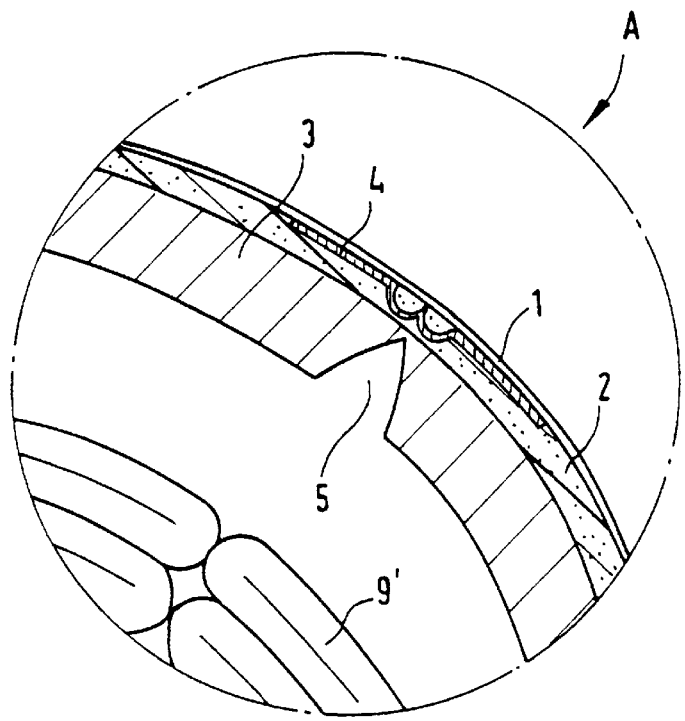
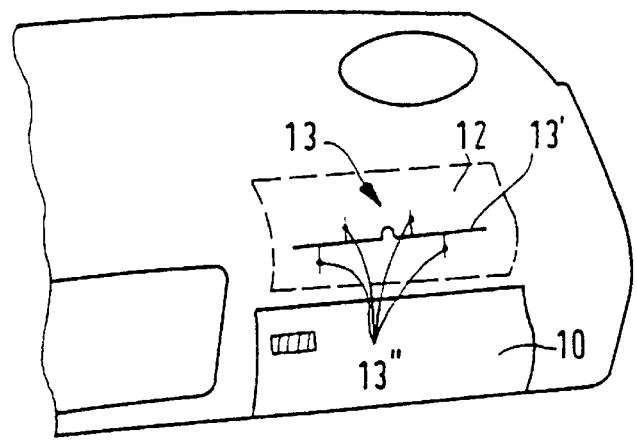
FIG. 4

A-A

INTERIOR TRIM PANEL FOR MOTOR VEHICLES FITTED WITH AN AIRBAG

CROSS-REFERENCES TO RELATED APPLICATIONS

This application is a U.S. national application of international application Ser. No. PCT/DE97/02515 filed Oct. 21, 1997, which claims priority to German Ser. No. 196 46 548.6 filed Oct. 31, 1996.

The invention relates to an interior trim panel for motor vehicles fitted with an airbag in accordance with the preamble of claim 1.

Passenger restraining devices with an inflatable gas bag, called "airbag" below, are increasingly used in motor vehicles, not only for the driver but also for the passenger, and both as front protection and as a side airbag to protect against a side-on collision. The driver's airbag to protect against head-on accidents has its "natural" place in the steering wheel hub and fits easily into the interior design of the vehicle; on the other hand, both passenger and side airbags require installation places which have a decisive effect on the overall impression of the interior, namely the free area of the dashboard in front of the passenger and the side panels of the doors. Complete airbag units, i.e. installation-ready combinations of gas generator, airbag and cover, interrupt these "design surfaces" through deviations in colour and pattern, but above all through the "seam pattern" which is produced and which, as a result of unavoidable installation tolerances, is frequently irregular and therefore ugly. Therefore there is the tendency to install passenger and side airbags "invisibly", i.e. to arrange them behind continuous covers.

In prior art, on separate complete airbag units, the coverings of the guide channel for the airbag are configured as single- or double-wing flaps, which may be swivelled around "plastic hinges" and thus release a penetration aperture under the pressure of the expanding airbag. This state of the art is also preserved in principle with the "invisible" installation of the airbag. "Flap grooves", i.e. cross-sectional weakenings of the supporting member which form a "plastic hinge" (if necessary reinforced with an incorporated intermediate metal ply), and "tear grooves" which are intended to ensure the opening of the flaps, here predetermine the opening region for the airbag in the continuous trim. The flaps defined by these grooves open under the pressure of the expanding airbag towards the passenger space, such that the airbag can stretch out in that direction (for example DE-GM 295 11 172).

What is problematic here is the tearing behaviour of the cover both in the necessary initial tearing and also as the tearing continues, which should happen as symmetrically as possible in order not to endanger the functioning of the airbag. It is therefore usual (DE-GM 295 11 172), also to weaken the cover along the tear seam in its cross-section, i.e. to notch it here. A cross-sectional weakening of more than 60% is here considered to be necessary and is also to some extent prescribed in works standard specifications. This procedure, however, still has a number of disadvantages:

The formation of large-area flaps when the airbag channel opens involves the danger of these flaps breaking away, which then mean an additional injury risk in the passenger area.

Realising in a defined manner a cross-sectional weakening of more than 60% requires, in view of the thickness tolerance of the covering films, considerable production and inspection outlay.

The necessary cross-sectional weakening of the covering film is so large that there is the danger that this region is obvious on the visible face.

There are proposals, therefore, to actuate cutting blades with the expanding airbag, in order to ensure defined tearing open of the cover independently of tolerances in the cover film thickness (U.S. Pat. No. 5,316,335), a type of procedure which requires additional manufacturing outlay and in which the relatively "robust" blades present a further injury risk (the blades sever both the supporting member and the cover).

The same is true for the airbag covering according to U.S. Pat. No. 5,375,875. Here an additional puncturing device with three puncturing prongs is attached behind a continuous flap, the prongs grasping locally through the closing flap when actuated. The additional puncturing device is connected, towards the airbag side, either by springs and/or a hinge to the continuous closing flap, which has surrounding it towards the decorative layer an erect rim which causes the tearing open of the decorative layer and thus the passage of the airbag. This solution, too, requires considerable manufacturing outlay.

The principle of tearing open the decorative layer in a more defined manner with the erect rim of a flap closing the exit aperture of the airbag, can also be found in U.S. Pat. No. 5,407,225; here, however, without any separate additional puncturing device. But even this simplified embodiment still has the disadvantage that additional weight and manufacturing outlay is necessary. In addition to this, one-stage manufacture of the interior trim panels, i.e. producing them in a single working cycle, is at least made more difficult.

Appreciating the state of the art outlined above in the accommodation of "invisible" airbags, the problem underlying the invention is to quote an interior trim panel which whilst preserving a faultless appearance, makes it possible for the airbag of an airbag unit disposed behind the trim to pass through in a defined manner, and this whilst ensuring reproducible tearing behaviour also of the covering, minimises the danger of trim panels breaking away and thus contributes to the safety of the occupants, and largely avoids additional production outlay for the "invisibility" of the airbags.

This problem is solved on an interior trim panel as per the preamble of claim 1, according to the invention, by the features of the characteristic part of this claim; claims 2 to 5 quote advantageous developments of the trim panel according to the invention.

The danger that opening single- or double-wing flaps are torn off and hurled into the vehicle interior, is avoided in that a different opening pattern is chosen: the rectangular covering region of the guide channel is torn open along its centre line and the tearing surface can be "weakened" by a plurality of short transverse tears. Since "plastic" hinges are dispensed with, no "flaps" are produced, rather the region torn open in this way opens with an approximately "pointed oval", i.e. in similar fashion to a fish's mouth. Here the edge region of the tear is deformed substantially resiliently and not so much loaded by locally concentrated plastic bending, and by this means the danger of material breaking away is largely avoided. The tearing pattern is here as is usual, provided by notches on the rear side of the supporting member. An essential role in the "fish's mouth solution" is played by the defined tearing behaviour of the covering film, which is optimised in that there is disposed between the supporting member and the cover film a cutting metal sheet, whose cutting edges coincide with the tear-open notches in the supporting member. By this means, simultaneous and even tearing open of the supporting member and the cover is ensured.

The cutting metal sheet is here, in contrast to the blades for example as per U.S Pat. No. 5,316,335 or U.S Pat. No. 5,375,875, not an expensive construction but a thin, foil-like metal sheet, preferably a steel foil which is between 0.05 mm and 0.2 mm thick, and into which the cutting edge pattern is introduced as a stamped-through pattern of slits.

Through the expanding airbag and aided by the notches in the supporting member, the tearing region first of all arches; in this process, the slit edges of the cutting metal sheet are erected and ensure the defined tearing of the cover together with that of the supporting member. The cutting metal sheet is simple and inexpensive to produce and can be disposed without outlay between the supporting member and the cover. Particularly if, as is most usual, a padding foam layer is in place, the thin cutting sheet is not marked on the visible face.

The tearing-open behaviour, above all the defined start of the "mouth opening" from the centre, can be further optimised in that the centre line of the notch pattern in the supporting member and of the cutting edge pattern in the cutting metal sheet has centrally an arc-shaped course, such that a tongue-shaped cutting zone with increased cutting stress is produced, which initiates the locally defined tearing of the cover.

It has a similarly advantageous effect if the cutting edges of the cutting sheet are stamped in the manner of sawteeth. Then, along the tearing lines, many stress accumulation zones are produced which aid the tearing open of the cover. The sawtooth shape is particularly advantageous for creating stress peaks during the tearing of the cover; other types of geometry such as for example an undulation of the cutting edges have a similar effect and can be used if it is expedient for production reasons, for example.

It is particularly advantageous if the rims of the cutting edges are configured concave and specifically with erect cutting edges pointing towards the cover and which if necessary can also be configured as sharpened cutters. What is achieved in this manner is that the cutting edges of the cutting sheet always assume an optimum cutting angle in relation to the cover, the cutting edges being able to be realised either toothed or undulated in this embodiment too.

The cutting metal sheet can be a continuous sheet metal sheet with a correspondingly stamped slit pattern. However it can also be advantageous if the cutting metal sheet has recesses, such that a web pattern is produced corresponding to the line pattern of the cutting edges. The cutting metal sheet becomes in this manner "non-resistant to bending" and does not prevent the arching of the tear-open area to form a "fish's mouth".

If the production flow makes it seem expedient, the cutting metal sheet can be applied and fixed during the production of the supporting member. In each case it is a help, however, if the cutting metal sheet is connected firmly adhering to the rear side of the cover. By this means, slipping movements of the cover in relation to the cutting metal sheet are prevented, through which a distribution of stress in the cover would be caused as the tearing region arched, which would lessen the desired concentration of stress in the cutting region.

It also can be advantageous from the point of view of production engineering, to first connect the cutting metal sheet to the cover by gluing or welding and then to attach the two of them together to the supporting member. In each case, the attachment of the cutting metal sheet to the cover prevents it from being hurled into the passenger area.

The guide channel for the airbag, integrally formed on the rear of the supporting member, can be reinforced by structural parts incorporated in or on said channel. These structural parts, generally sheet metal parts, can be used as attachment support points for the supporting member on the vehicle body, and ensure that the reaction forces of the airbag expansion are taken up. Furthermore they can be configured geometrically as damping elements to reduce momentary peaks in the reaction forces, for example through an undulation or through a perforation through which a deformation zone is predetermined.

The tearing open of the cover can naturally also be additionally improved in that the cover is weakened in cross-section at least in the central region of the cutting metal sheet, coinciding with its cutting edges. This can happen both through notches on the rear side and also through a micro-perforation, not visible to the naked eye, introduced for example by laser beam. Since in this additional measure, high requirements are not placed either on the size nor on the tolerance of the cross-sectional weakening of the cover, the difficulties usual in the traditional state of the art do not occur.

Figure 2:
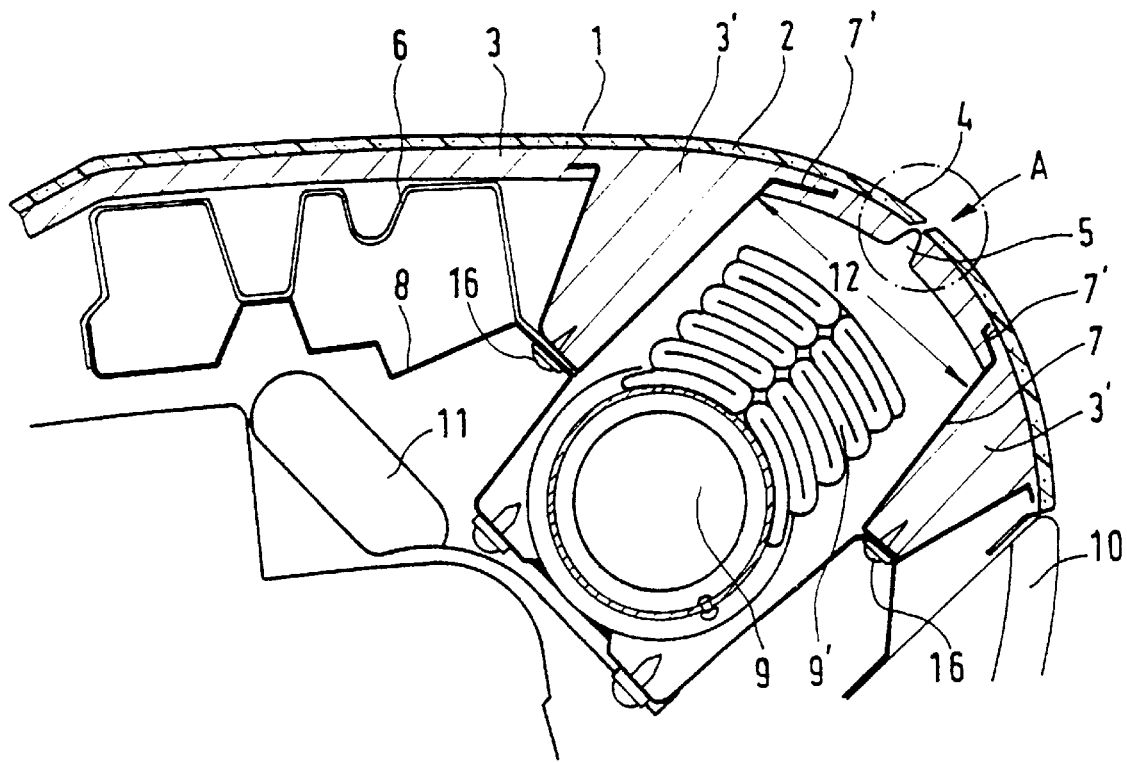
Figure 5:
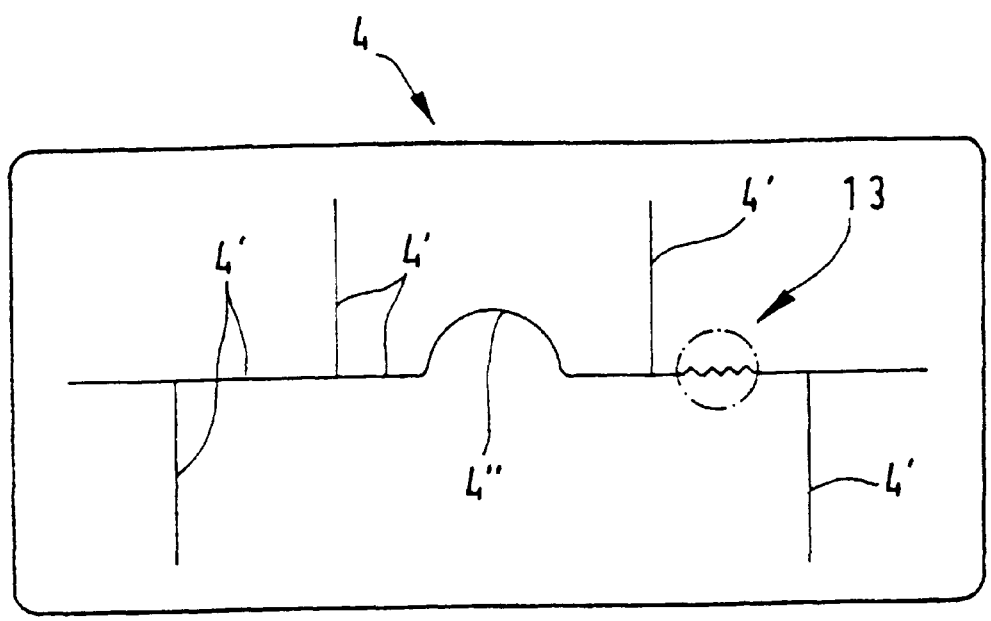
Figure 6:
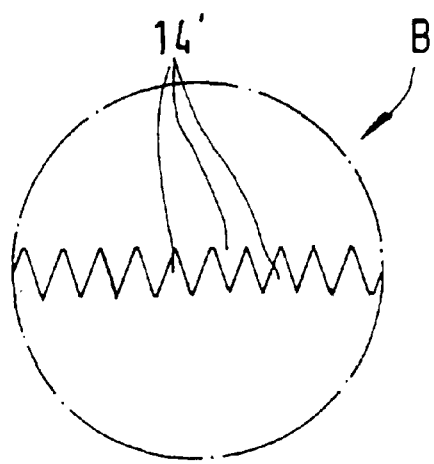
Figure 7:
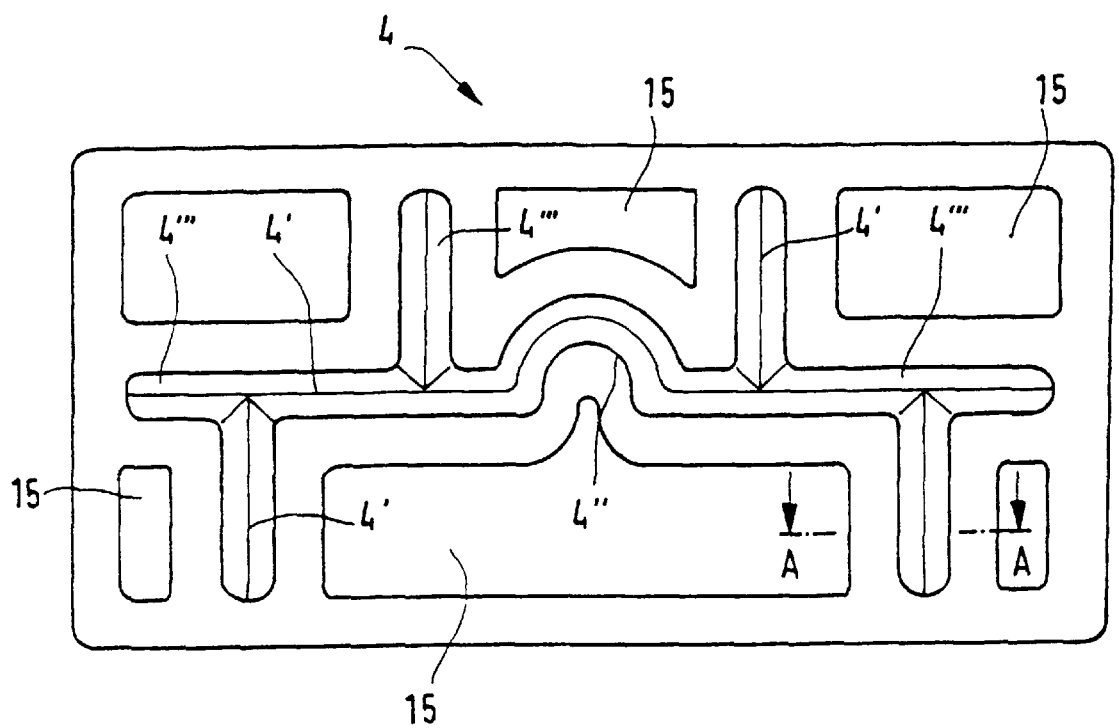
Figure 8:
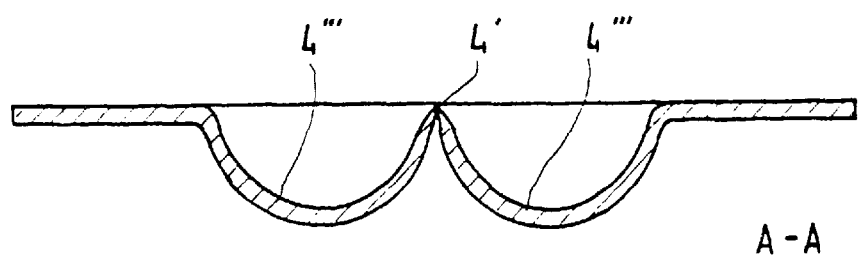
Figure 9:
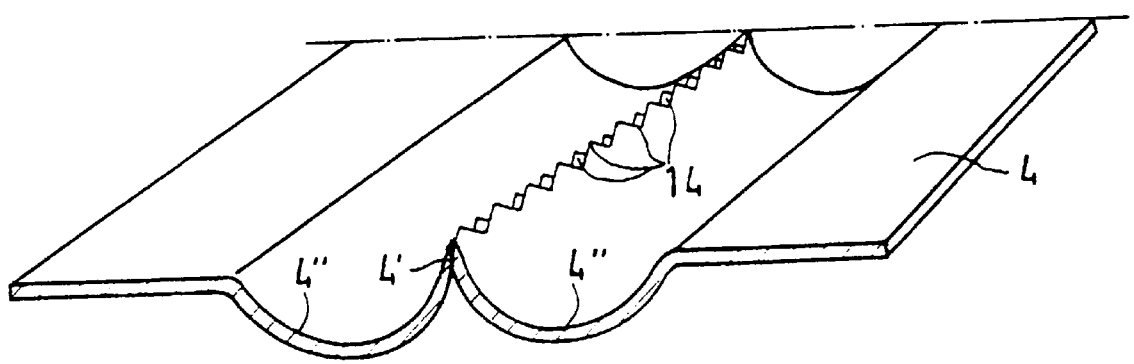

The invention is now explained in greater detail with the aid of FIGS. 1–9. These show in detail:

FIG. 1 a schematically represented view of a dashboard with the marked installation region of a passenger airbag, FIG. 2 details of the trim panel with the aid of a sectional view of the cutting plane II./.II, marked in FIG. 1, FIG. 3 in an enlarged view, details of the tear-open area in FIG. 2 indicated with "A", FIG. 4 in a partial view of FIG. 1, the tearing pattern for the supporting member, which makes possible the passage of the airbag, FIG. 5 the plan view of a cutting metal sheet with toothed cutting edges, FIG. 6 a toothed cutting edge according to an enlarged detail from FIG. 5, FIG. 7 a plan view analogous to FIG. 5 of a skeletonised cutting metal sheet on which the cutting edges are erect, FIG. 8 a section along the line VIII—VIII in FIG. 7, and FIG. 9 erect cutting edges with toothing in a partial perspective view.

In FIG. 1, 12 refers to the installation or opening region of the covered airbag unit which is attached above the glove compartment 10. The broken line II./.II marks the cutting plane which is represented in FIG. 2. There, 1 refers to the cover and 3 to the supporting member of the dashboard, which member has moulded onto its rear the airbag guide channel 3' reinforced by structural parts 7. The base portions 7' of the structural parts 7 protruding into the wall of the supporting member 3, reinforce the base of the opening region 12 of the guide channel 3' and thus prevent trim panels from breaking away during the expansion of the airbag. The airbag unit consists of the gas generator 9 and the airbag 9', and is attached to the structural member profiles indicated with 6 and 8, which form a continuous module carrier. The transverse bar, reinforcing the module carrier 6, 8 is referred to as 11, and, finally, a padding foam layer disposed between the supporting member 3 and the cover 1 is referred to as 2. The formation of the tear seam is shown in greater detail in FIG. 3. The cross-section of the supporting member 3 is to this end considerably reduced by a notch 5. Opposite the notch base, between the cover 1 and the supporting member 3, embedded in the padding foam layer 2 in the example shown, the erect cutting edges of a cutting metal sheet 4 can be recognised. The notches 5 and the cutting edges of the cutting metal sheet 4 form the tearing pattern 13 in FIG. 4, which is composed of a centre line 13' and side lines 13".

A simple cutting metal sheet 4 is represented in FIG. 5. A rectangular, approximately 0.1 mm thick metal sheet is provided with stamped-through slits 4'. The size of the sheet here corresponds approximately to the opening region 12 of the guide channel 3' and the slit pattern corresponds to the tearing pattern 13 predetermined by the notches 5.

The slits 4', which become cutting edges during the arching in the case of expansion, are shown running in a straight line in FIG. 5 to simplify the drawing. However, as the enlarged detail B reproduced in FIG. 6 shows, they run in a zigzag and form the toothing 14' to enable the cover to be torn open more easily. A tongue 4", running in an arc, ensures that the tearing of the cover 1 begins in the centre and then can run on towards both sides.

FIG. 7 shows another embodiment of a cutting metal sheet 4. It is skeletonised by the recesses 15. The cutting edges 4' are erected with the aid of the cavities 4''', as FIG. 8 shows with the aid of section A—A in FIG. 7. They can here still be toothed (FIG. 9) and thus be improved in their functioning, since the teeth 14 sever the cover 1 more easily.

The figures explain the invention through the example of a dashboard; however it is obvious that, for example, door interior trims can be provided in the same manner with "invisible" airbag fittings.

What is claimed is:

1. Interior trim panel for vehicles fitted with an airbag, said panel comprising a dimensionally stable supporting member (3) provided with a film cover (1) on its visible face and having at the point where the airbag (9') is installed a penetration area which may be torn open by the expansion of the airbag and which is predetermined by incorporated weak points, and having a rear-side airbag guide channel (3') whose opening (12) is covered by the supporting member (3) and by the cover (1) without any markings on the visible face, a tear-open area, in the region of the guide channel opening (12) and opening as the airbag (9') expands, being predetermined by notches (5) in the supporting member (3) which reduce the cross-section, and the tearing open of the film cover (1) in the region of the notches (5) being supported by cutting devices which are actuated by the expansion of the airbag, wherein, in the region of the notches (5) between the supporting member (3) and the cover (1), there is disposed as a cutting device a cutting metal sheet (4) whose cutting edges (4') are formed from stamped-through slits which coincide with the course of the notches (5).

2. Trim panel according to claim 1 wherein, in the region of the guide channel opening (12), a tear-open area opening approximately in a pointed oval during the expansion of the airbag (9') is predetermined by notches (5) in the supporting member (3), which reduce the cross-section and form a line pattern (13) consisting of a center line (13') and side lines (13") which branch off at right angles from the center line (13) or run at an oblique angle to same, and in that, in the region of the line pattern (13) between the supporting member (3) and the cover (1) there is disposed the cutting metal sheet (4) with the cutting edges (4') which coincide with the line pattern (13) of the notches (5).

3. Trim panel according to claim 2 wherein the notch (5) predetermining the center line (13') of the line pattern (13) and the associated cutting edge (4') of the cutting metal sheet (4) have an arcuate course forming a local tongue (4").

4. Trim panel according to claim 3 wherein the cutting metal sheet (4) is between 0.05 mm and 0.5 mm thick.

5. Trim panel according to claim 3 wherein the stamped-through slits of the cutting edges (4') are sawtooth-configured, the dimensions of the "saw teeth" (14') being small in relation to the dimensions of the line pattern (13).

6. Trim panel according to claim 2 wherein the cutting metal sheet (4) is between 0.05 mm and 0.5 mm thick.

7. Trim panel according to claim 2 wherein the stamped-through slits of the cutting edges (4') are sawtooth-configured, the dimensions of the "saw teeth" (14') being small in relation to the dimensions of the line pattern (13).

8. Trim panel according to claim 2 wherein the cutting metal sheet (4) between its contour and the cutting edges (4') contains recesses (15) in such a manner that the cutting sheet (4) has a web pattern corresponding to the line pattern (13).

9. Trim panel according to claim 1 wherein the cutting sheet (4) is attached to the rear side of the cover (1).

10. Trim panel according to claim 1 wherein the guide channel (3') formed integrally on the supporting member (3) has reinforcing structural parts (7).

11. Trim panel according to claim 10 wherein the reinforcing structural parts (7) of the guide channel (3') have fastening points (16) to which the trim panel may be fixed on the vehicle body.

12. Trim panel according to claim 1 wherein the cover (1) is weakened in cross-section at least in the central region (4") of the cutting metal sheet, coinciding with its cutting edges (4').

13. Trim panel according to claim 12 wherein the cross-sectional weakening comprises notching on the rear side of the cover (1).

14. Trim panel according to claim 12 wherein the cross-sectional weakening comprises a micro-perforation of the cover (1).

15. Trim panel according to claim 12 wherein the cross-sectional weakening forms part of an imprint on the cover (1) on its visible face.

16. Trim panel according to claim 1 wherein the cutting metal sheet (4) is between 0.05 mm and 0.5 mm thick.

17. Trim panel according to claim 16 wherein the stamped-through slits of the cutting edges (4') are sawtooth-configured, the dimensions of the "saw teeth" (14') being small in relation to the dimensions of the line pattern (13).

18. Trim panel according to claim 1 wherein the stamped-through slits of the cutting edges (4') are sawtooth-configured, the dimensions of the "saw teeth" (14') being small in relation to the dimensions of the line pattern (13).

19. Trim panel according to claim 1 wherein the cutting edges (4') are configured concave with erect rims pointing towards the cover (1) and sharpened like cutters.

20. Trim panel according to claim 19 wherein the cutting edges (4') of the cutting sheet (4) are sawtooth-configured.

* * * * *